United States Patent Office 2,777,980
Patented Jan. 15, 1957

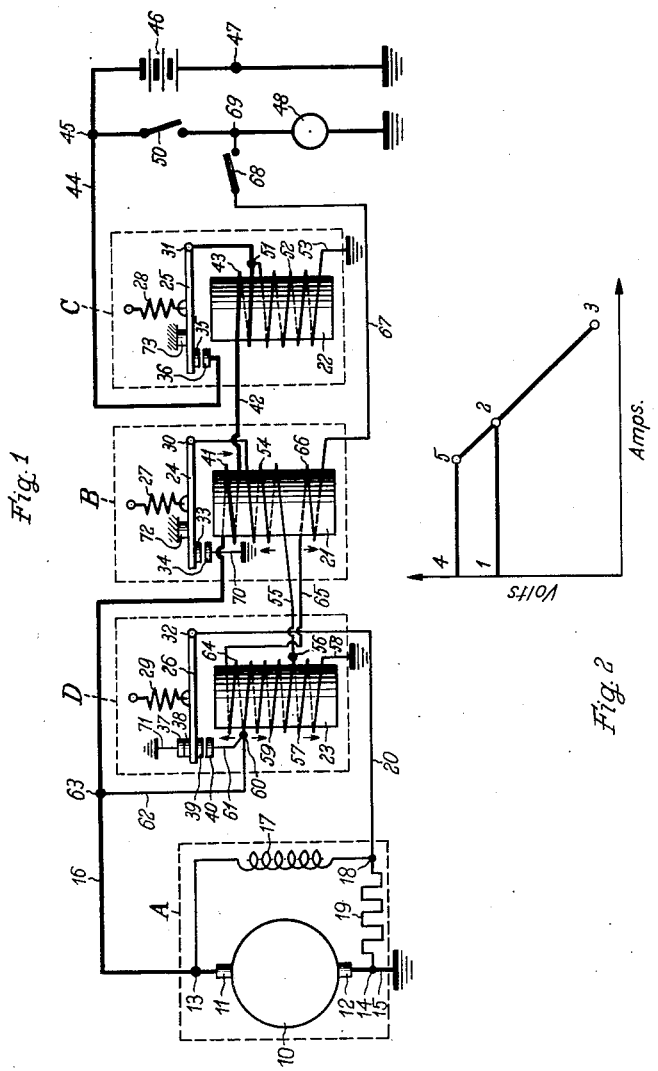

2,777,980
SEASONAL CONTROL MEANS FOR BATTERY CHARGING

Friedrich Menzel, Stuttgart, Germany

Application July 15, 1953, Serial No. 368,032

14 Claims. (Cl. 320—22)

The invention relates to a seasonal control means for charging storage batteries.

It is one of the objects of the invention to provide a control means for properly controlling the battery loading current in relation to the season.

It is another object of the invention to provide for generator current control means dependent on the charging rate of the battery.

It is a further object of the invention to provide control means that are simple in design and easily applicable to present constructions.

With these objects in view the invention consists in a storage battery, a generator selectively adjusted for a higher or lower charging rate respectively, a temperature responsive means, a regulating relay means having field producing means and being adapted to regulate the generator voltage, the arrangement being such that upon operation of the temperature responsive means the field producing means of the regulating relay means are increased either by increasing the current in one of its coils at a certain voltage and/or energizing a booster coil arranged on said regulating relay means, whereby the voltage regulated by the regulating means is increased by a predetermined value.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings, in which:

Fig. 1 shows a diagrammatic view of the system according to the invention;

Fig. 2 is a voltage-ampere diagram of the system according to the invention.

In Fig. 1A is a generator of the D. C. shunt type, which may be driven by the engine of an automobile at variable speed. The generator A comprises an armature 10 with two brushes 11 and 12 connected to the terminals 13 and 14, the latter being grounded at 15 and the formed connected to a conductor 16. A field 17 of the generator A is connected with its one end to terminal 13 and with its other end to a junction 18, to which an ohmic resistance 19 and a conductor 20 is connected, the other end of the ohmic resistance 19 being connected to terminal 14.

Conductors 16 and 20 connect generator A with three relays, i. e., a control relay B, an automatic switch C and a regulating relay D, which will now be described. The three relays B, C and D are actuated by electro-magnets having cores 21, 22 and 23 respectively which attract armatures 24, 25 and 26 respectively against the force of springs 27, 28 and 29 respectively, the armatures being pivoted at 30, 31 and 32 respectively.

At the end of armature 24 of the control relay B a contact point 33 is attached which is located opposite a stationary contact point 34 cooperating with the aforementioned contact point 33, spring 27 forcing the cooperating contact points away from each other, so that the contact points are separated when the automatic switch is deenergized. A stop element 72 limits the motion of the armature 24 under the action of spring 28. At the end of armature 25 of the automatic switch C a contact point 35 is fixed opposite of which a stationary contact point 36 is arranged, both contact points being separated when automatic switch C is deenergized, because spring 28 urges contact point 35 away from contact point 36 with the movement of armature 25 being limited by an insulated stop means 73. Armature 26 of regulating relay D is provided with two contact points 38 and 39 on either side, with a stationary contact point 37 arranged opposite contact point 38 and a stationary contact point 40 opposite contact point 39, the action of spring 30 being such that contact points 37 and 38 are closed when regulating relay D is deenergized.

Conductor 16 connects to a series coil 41 arranged on core 21 and a conductor 42 connects coil 41 to a series coil 43 provided on core 22, the end of coil 43 being attached to pivot 31 of armature 25. Contact point 36 is connected by conductor 44 to a terminal 45 of a battery 46 whose other terminal 47 is connected to ground. Connected in parallel to the battery 46 is a lamp 48, preferably a tail lamp, a switch 50 serving to cut the lamp in or out as desired.

Connected at 51 to the series coil 43 is a shunt coil 52, whose other end is grounded at 53. Control relay B is fitted with a shunt coil 54 connected with its one end to pivot 30 and with its other end by means of conductor 55 to a junction 56, to which a shunt coil 57 arranged on core 23 is connected whose other end is grounded at 58. On core 23 a second shunt coil 59 is provided whose one end is connected to junction 56 and whose other end to a junction 60, which is connected by a conductor 61 to contact point 40 and a conductor 62 to junction 63 of conductor 16. Connected to junction 60 is a shunt coil 64 arranged on core 23 whose other end is connected by means of a conductor 65 to a shunt coil 66 on core 21 whose other end is connected through conductor 67 to a bi-metal switch 68 which is connected to a junction 69 between switch 50 and lamp 48. Contact points 34 and 37 are grounded at 70 and 71.

The operation of the system of Fig. 1 is as follows:

When generator A is operated by an automobile engine, voltage will be generated, the field circuit being completed from junction 18 by conductor 20, armature 26, contact points 38 and 37, conductor 71 to ground. A comparatively small field current will flow from junction 18, resistance 19 to ground. The voltage generated will cause a current to flow through conductor 16, series coil 41, conductor 42, series coil 43, shunt coil 52 to ground at 53. Also, a current will flow from junction 60 through shunt coil 59, shunt coil 57 to ground at 58 with both coils acting cumulatively. Thus switch relay C and regulating relay D are energized. At a certain predetermined voltage exceeding somewhat that of battery 46, core 22 of switch relay C will attract armature 25 whereupon the contact points 35 and 36 will close. Now a current may flow from generator A through conductor 16, coil 41, conductor 42, coil 43, armature 25, contact points 35 and 36, conductor 44 to battery 46. When the speed of generator A rises still further so that the voltage tends to increase beyond a predetermined value, armature 26 of regulating relay D will under the action of shunt coils 59 and 57 be further attracted by core 23 with the result that the contact of contact points 38 and 37 will be broken. Now junction 18 is no longer grounded so that the field current is forced to flow to ground through the ohmic resistance 19 alone. Thus the field current will decrease and also the voltage generated, whereupon the contact points 37 and 38 will close again. This will cause the armature 26 to vibrate at high frequency, opening and closing these points in a manner well known in the art. When the speed of generator A is so increased that the voltage produced with the ohmic resistance 19 in series with field 17 is raised by a further small increment to a predetermined amount, then armature 26 will be pulled further towards core 23 through the increased magnetic force, whereupon contact points 39 and 40 will be closed with the result that field 17 will be short circuited. From then on the armature 26 will vibrate in such a manner that contact points 39 and 40 are made and broken.

In spite of the arrangement described so far it may happen that the total current supplied by the generator exceeds a certain predetermined maximum value, with the result that the generator would get overloaded and possibly damaged. This is prevented by the action of control relay B which is operated by the action of series coil 41. When armature 24 is attracted by core 21 the contact points 33 and 34 will be closed whereupon an additional current will flow from junction 60, shunt coil 59, junction 56, shunt coil 54, armature 24, contact points 33 and 34 to ground at 70. As this current flows in the same direction as the hitherto current in shunt coil 59 the total current of shunt coil 59 will be higher than before and the total ampere turns of coils 59 and 57 on core 23 will increase with the result that the armature, responding to a fixed number of ampere turns, will be attracted at a lower voltage level. The coil 54 acts subtractively to the series coil 41 on core 21, so that the contact points 33 and 34 will reopen. Thus these latter points will be quickly made and broken with the armature 24 vibrating at a high frequency.

While so far the voltage and amperage of generator A have followed line 1—2 of Fig. 2, the generator will upon coming into action of control relay B operate along line 2—3, i. e. the voltage will be decreased at a predetermined rate when the current rises. By proper selection of the various parts influencing the regulation, conditions may be made so that the total power of the generator will remain constant. The curve 1—2—3 will be used when driving in summer during the day and night and in winter at night, since the voltage corresponding to line 1 and 2 will be the proper voltage for operating the lights of the automobile.

At certain times, i. e. in winter, it will be desirable to charge the battery at a higher voltage as the battery will otherwise not become fully charged. To that end a thermal responsive switch 68 is provided which closes at a certain minimum temperature, e. g. 0° C., and reopens at a certain higher temperature, e. g. 15° C., said switch being preferably arranged near the battery so that it has practically the same temperature as the battery.

Upon closing of said switch 68, current will flow from junction 63, conductor 62, shunt coil 64, conductor 65, shunt coil 66, conductor 67, thermal responsive switch 68, junction 69, tail light 48 to ground. As coil 64 acts subtractively to coils 57 and 59, the regulating relay will regulate at a higher voltage of predetermined value according to the size of coil 64. Thus the generator A will operate along line 4—5 of Fig. 2.

In order to achieve the voltage drop at point 5, i. e. on the prolongation of line 2—3, coil 66 is wound so as to act cumulatively to series coil 41 with the result that the regulating relay will come in action at a lower amperage than before.

Upon closing of switch 50, i. e., when the lights are switched on, current will no longer flow through coils 64 and 66 since junctions 69 and 45 will have the same potential. Thus the voltage will be lowered to that indicated by line 1—2 of Fig. 2, i. e., a voltage not detrimental to the lamps.

In Fig. 1 the tail light 48 is shown because, regardless of the lamps turned on, the tail light will always be cut in, and the voltage will thus be lowered to normal whenever a light is turned on. But other lamps may similarly be used.

When the speed of generator A is lowered to such an extent that the voltage generated drops below the battery voltage current will flow from the battery to the generator and switch relay C will be opened through the action of series coil 43 which opposes the action of shunt coil 52.

As may be seen from the figures in connection with the description, the resistance 19 may be comparatively small due to the short circuiting action of the lower pair of contact elements of the regulating relay. Thus outside vibrations will have a very small effect on the rapidly vibrating contact points of both the regulating and the control relay, as a deflecting of a contact point will affect the voltage generated to a practically negligible degree. Thus it may be possible to mount all relays belonging to a combination according to the invention on the generator controlled by such relays without the vibrations of the generator affecting the action of the relays.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an arrangement of the character described, in combination, a generator; regulating means for maintaining the output voltage of said generator at a predetermined level; actuating means for actuating said regulating means to change the output voltage of said generator by a predetermined amount during operation of said actuating means; a load connected to said generator; a switch connected in circuit between said generator and said load; and de-actuating means operated by said switch when moved into position connecting said generator with said load for de-actuating said actuating means to maintain the output voltage of said generator at said predetermined level thereof despite the action of said actuating means.

2. In an arrangement of the character described, in combination, a generator; regulating means for maintaining the output voltage of said generator at a predetermined level; temperature compensating actuating means for actuating said regulating means to change the output voltage of said generator by a predetermined amount during operation of said actuating means; a load connected to said generator; a switch connected in circuit between said generator and said load; and de-actuating means operated by said switch when moved into position connecting said generator with said load for de-actuating said actuating means to maintain the output voltage of said generator at said predetermined level thereof despite the action of said actuating means.

3. In an arrangement of the character described, in combination, a generator; regulating means for maintaining the output voltage of said generator at a predetermined level; temperature actuated means for automatically actuating said regulating means to change the output voltage of said generator by a predetermined amount during operation of said temperature actuated means at a desired temperature; a load connected to said generator; a switch connected in circuit between said generator and said load; and de-actuating means operated by said switch when moved into position connecting said generator with said load for de-actuating said actuating means to maintain the output voltage of said generator at said predetermined level thereof despite the action of said temperature actuated means.

4. In an arrangement of the character described, in combination, a generator; regulating means for maintaining the output voltage of said generator at a predetermined level, said regulating means including at least a regulating relay which operates at the predetermined level of output voltage of said generator and a control relay which operates at a predetermined level of output current of said generator; a first auxiliary winding wound about the core of said regulating relay; a second auxiliary winding wound about the core of said control relay; and thermally actuated means for automatically connecting said first and second auxiliary windings across the output of said generator at a desired temperature whereby during operation of said thermally actuated means the operating voltage of said regulating relay is changed to vary the regulated output voltage of said generator by a predetermined amount and the operating current level of said control relay is changed to vary the output current of said generator by a predetermined amount.

5. In an arrangement of the character described, in combination, a generator; regulating means for maintaining the output voltage of said generator at a predetermined level, said regulating means including at least a regulating relay which operates at the predetermined level of output voltage of said generator; an auxiliary winding wound about the core of said regulating relay; a load connected to said generator; a switch in the connection between said generator and said load; actuating means for connecting said auxiliary winding across the output of said generator to change the operating voltage of said regulating relay and thereby vary the regulated output voltage of said generator by a predetermined amount; and means operated by said switch when moved into position connecting said generator with said load for short circuiting said auxiliary winding whereby the regulated output voltage of said generator returns to said predetermined level.

6. In an arrangement of the character described, in combination, a generator; regulating means for maintaining the output voltage of said generator at a predetermined level, said regulating means including a least a control relay which operates at a predetermined level of output current of said generator; an auxiliary winding wound about the core of said control relay; a load connected to said generator; a switch in the connection between said generator and said load; actuating means for connecting said auxiliary winding across the output of said generator to change the operating current of said control relay and thereby vary the output current of said generator by a predetermined amount; and means operated by said switch when moved into position connecting said generator with said load for short circuiting said auxiliary winding whereby the output current of said generator returns to its original value despite the operation of said actuating means.

7. In an arrangement of the character described, in combination, a generator; regulating means for maintaining the output voltage of said generator at a predetermined level, said regulating means including at least a regulating relay which operates at the predetermined level of output voltage of said generator and a control relay which operates at a predetermined level of output current of said generator; a first auxiliary winding wound about the core of said regulating relay; a second auxiliary winding wound about the core of said control relay; a load connected to said generator; a switch in the connection between said generator and said load; actuating means for connecting said first and second auxiliary windings across the output of said generator to vary the regulated output voltage of said generator and the output current of said generator by a predetermined amount; and means operated by said switch when moved to position connecting said generator to said load for short circuiting said first and said second auxiliary windings whereby the regulated output voltage of said generator returns to said predetermined level and the output current of said generator returns to its original value despite the action of said actuating means.

8. In an arrangement of the character described, in combination, a generator; regulating means for maintaining the output voltage of said generator at a predetermined level, said regulating means including at least a regulating relay which operates at the predetermined level of output voltage of said generator; an auxiliary winding wound about the core of said regulating relay; a load connected to said generator; a switch in the connection between said generator and said load; thermally actuated means for connecting said auxiliary winding across the output of said generator to change the operating voltage of said regulating relay and thereby vary the regulated output voltage of said generator by a predetermined amount; and means operated by said switch when moved into position connecting said generator with said load for short circuiting said auxiliary winding whereby the regulated output voltage of said generator returns to said predetermined level despite the operation of said thermally actuated means.

9. In an arrangement of the character described, in combination, a generator; regulating means for maintaining the output voltage of said generator at a predetermined level, said regulating means including at least a control relay which operates at a predetermined level of output current of said generator; an auxiliary winding wound about the core of said control relay; a load connected to said generator; a switch in the connection between said generator and said load; thermally actuated means for connecting said auxiliary winding across the output of said generator to change the operating current of said control relay and thereby vary the output current of said generator by a predetermined amount; and means operated by said switch when moved into position connecting said generator with said load for short circuiting said auxiliary winding whereby the output current of said generator returns to its original value despite the operation of said thermally actuated means.

10. In an arrangement of the character described, in combination, a generator; regulating means for maintaining the output voltage of said generator at a predetermined level, said regulating means including at least a regulating relay which operates at the predetermined level of output voltage of said generator and a control relay which operates at a predetermined level of output current of said generator; a first auxiliary winding wound about the core of said regulating relay; a second auxiliary winding wound about the core of said control relay; a load connected to said generator; a switch in the connection between said generator and said load; thermally actuated means for connecting said first and second auxiliary windings across the output of said generator to vary the regulated output voltage of said generator and the output current of said generator by a predetermined amount; and means operated by said switch when moved to position connecting said generator to said load for short circuiting said first and said second auxiliary windings whereby the regulated output voltage of said generator returns to said predetermined level and the output current of said generator returns to its original value despite the action of said thermally actuated means.

11. In an arrangement of the character described for use in motor vehicles, comprising, in combination, a generator; regulating means for maintaining the output voltage of said generator at a predetermined level; actuating means for actuating said regulating means to change the output voltage of said generator by a predetermined amount during operation of said actuating means; lights for said motor vehicle connected to said generator; a switch connected in circuit between said generator and said vehicle lights; and de-actuating means operated by said switch when moved into position connecting said generator with said vehicle lights for de-actuating said actuating means to maintain the output voltage of said generator at said predetermined level thereof despite the action of said actuating means.

12. In an arrangement of the character described for use in motor vehicles, comprising, in combination, a generator; regulating means for maintaining the output voltage of said generator at a predetermined level; temperature actuated means for automatically actuating said regulating means to change the output voltage of said generator by a predetermined amount during operation of said temperature actuated means at a desired temperature; lights for said motor vehicle connected to said generator; a switch connected in circuit between said generator and said vehicle lights; and deactuating means operated by said switch when moved into position connecting said generator with said vehicle lights for deactuating said actuating means to maintain the output voltage of said generator at said predetermined level thereof despite the action of said temperature actuated means.

13. In an arrangement of the character described for use in motor vehicles, comprising, in combination, a generator; regulating means for maintaining the output voltage of said generator at a predetermined level; actuating means for actuating said regulating means to increase the output voltage of said generator by a predetermined amount during operation of said first actuating means; lights for said motor vehicle connected to said generator; a switch connected in circuit between said generator and said vehicle lights; and deactuating means operated by said switch when moved into position connecting said generator with said vehicle lights for deactuating said actuating means to maintain the output voltage of said generator at said predetermined level thereof despite the action of said actuating means.

14. In an arrangement of the character described for use in motor vehicles, comprising, in combination, a generator; regulating means for maintaining the output voltage of said generator at a predetermined level; temperature actuated means for automatically actuating said regulating means to increase the output voltage of said generator by a predetermined amount during operation of said temperature actuated means at a desired temperature; lights for said motor vehicle connected to said generator; a switch connected in circuit between said generator and said vehicle lights; and deactuating means operated by said switch when moved into position connecting said generator with said vehicle lights for deactuating said actuating means to maintain the output voltage of said generator at said predetermined level thereof despite the action of said temperature actuated means.

References Cited in the file of this patent
UNITED STATES PATENTS

| Number | Name | Date |
|---|---|---|
| 1,846,214 | Leingang | Feb. 23, 1932 |
| 1,919,892 | Leingang | July 25, 1933 |
| 1,976,404 | Leingang | Oct. 9, 1934 |
| 2,136,716 | Toelle | Nov. 15, 1938 |
| 2,209,051 | Clayton | July 23, 1940 |
| 2,244,307 | Menzel | June 3, 1941 |
| 2,310,514 | Callender | Feb. 9, 1943 |
| 2,427,729 | Jenkins | Sept. 23, 1947 |
| 2,431,311 | Cronvall | Nov. 25, 1947 |
| 2,469,092 | Webb | May 3, 1949 |
| 2,657,351 | Kuhar | Oct. 27, 1953 |